(12) United States Patent
Vollmert et al.

(10) Patent No.: US 11,521,274 B2
(45) Date of Patent: Dec. 6, 2022

(54) COST ALLOCATION ESTIMATION USING DIRECT COST VECTORS AND MACHINE LEARNING

(71) Applicant: SAP SE, Walldorf (DE)

(72) Inventors: Steffen Vollmert, Frankfurt (DE); Luisa Karl, Neuhofen (DE); Konrad Schenk, Potsdam (DE); Olga Cherepanova, Malschenberg (DE); Janet Dorothy Salmon, Dudenhofen (DE); Ralf Ille, Karlsdorf-Neuthard (DE); Thomas Zuerker, Roemerberg (DE)

(73) Assignee: SAP SE, Walldorf (DE)

( * ) Notice: Subject to any disclaimer, the term of this patent is extended or adjusted under 35 U.S.C. 154(b) by 233 days.

(21) Appl. No.: 16/358,850

(22) Filed: Mar. 20, 2019

(65) Prior Publication Data
US 2020/0302550 A1 Sep. 24, 2020

(51) Int. Cl.
*G06Q 40/00* (2012.01)
*G06N 20/00* (2019.01)

(52) U.S. Cl.
CPC ............ *G06Q 40/12* (2013.12); *G06N 20/00* (2019.01)

(58) Field of Classification Search
CPC combination set(s) only.
See application file for complete search history.

(56) References Cited

U.S. PATENT DOCUMENTS

| | | | |
|---|---|---|---|
| 7,624,341 B2 | 11/2009 | Salmon et al. | |
| 9,075,800 B2 | 7/2015 | Vollmert | |
| 2010/0088137 A1 | 4/2010 | Weiss et al. | |
| 2014/0278707 A1 | 9/2014 | Rothley et al. | |
| 2017/0140399 A1 | 5/2017 | Wu et al. | |
| 2017/0206481 A1* | 7/2017 | Cheeran | G06Q 30/0635 |
| 2017/0249649 A1* | 8/2017 | Garvey | G06N 20/00 |
| 2017/0316499 A1 | 11/2017 | Vollmert et al. | |
| 2019/0266690 A1* | 8/2019 | Mandeno | G06Q 10/06 |

* cited by examiner

*Primary Examiner* — Peter Ludwig
*Assistant Examiner* — Reva R Moore
(74) *Attorney, Agent, or Firm* — Fish & Richardson P.C.

(57) ABSTRACT

The disclosure generally describes methods, software, and systems for estimating cost allocations, including a method for the following steps. Using a machine learning system, transactions are consolidated into estimated sender-receiver totals for costs transmitted by senders to receivers in an organization. A sender-receiver percentage matrix is determined from the estimated sender-receiver totals of a given sender and for each receiver of the transactions from the given sender. The sender-receiver percentage matrix includes, for each sender, estimated sender-receiver percentages. Current actual costs are determined for each sender to receivers for a given time period. Estimated cost allocations are determined for given time period using the sender-receiver percentage matrix. The estimated cost allocations are determined for each receiver in the organization based on a function of the current actual costs for each sender. A report that includes the estimated cost allocations is provided for presentation to a user.

11 Claims, 13 Drawing Sheets

TOTAL ca. 36 h

READ DATA (4 h) | PROCESS ALLOCATIONS (26 h) | WRITE DATA (6 h)
208

204 — SENDERS: MULTIPLE COST CENTER + ACCOUNT COMBINATIONS

| COST CENTER | JANUARY 2010 ACCOUNT | AMOUNT |
|---|---|---|
| CC_001 | 123<br>782 | 878,87€<br>272,17€ |
| CC_002 | 768<br>843 | 9877,09€<br>76129,80€ |
| CC_026 | 125<br>365<br>655 | 414,98€<br>1247,87€<br>95,00€ |
| CC_027 | 568 | 85478,33€ |
| CC_438 | 455<br>567<br>677<br>891 | 54,87€<br>951,35€<br>65478,92€<br>852,11€ |
| CC_622 | 457 | 3698,41€ |
| TOTAL BEFORE | | 245429,77€ |
| TOTAL AFTER | | 0,00€ |

202 — ALLOCATIONS: MULTIPLE ALLOCATION-CYCLE "DEFINITIONS"

N : M

206 — RECEIVERS: MULTIPLE COST CENTER + ACCOUNT COMBINATIONS

| COST CENTER | JANUARY 2010 ACCOUNT | AMOUNT |
|---|---|---|
| CC_302 | 123 | 874,54€ |
| CC_042 | 768<br>843 | 19875,09€<br>99129,80€ |
| CC_325 | 125 | 4414,38€ |
| CC_891 | 568 | 96478,31€ |
| CC_990 | 221 | 24657,65€ |
| TOTAL BEFORE | | 0,00€ |
| TOTAL AFTER | | 245429,77€ |

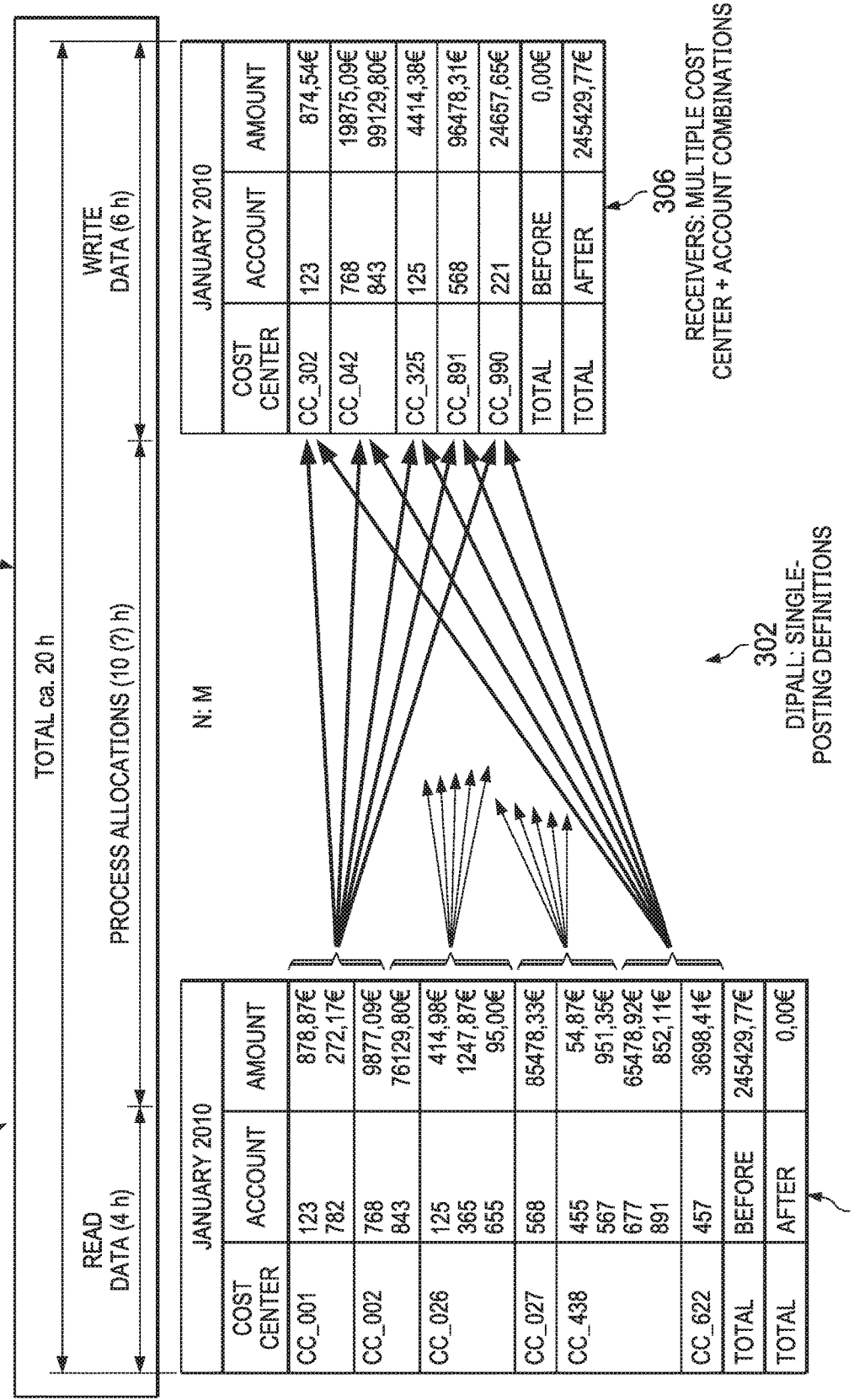

COST ALLOCATION ESTIMATION USING DIRECT COST VECTORS AND MACHINE LEARNING

BACKGROUND

The present disclosure relates to estimating cost allocations. Controlling (CO) allocations, or cost allocations, are part of some companies' closing processes, such as occurring at month-end. At some large enterprises, the total processing time of the allocation cycles can take more than 24 hours.

SUMMARY

This disclosure generally describes computer-implemented methods, software, and systems for estimating cost allocations using direct cost vectors and machine learning. One computer-implemented method includes: consolidating, using a machine learning system, transactions into estimated sender-receiver totals for costs transmitted by senders to receivers in an organization; determining, from the estimated sender-receiver totals of a given sender and for each receiver of the transactions from the given sender, a sender-receiver percentages matrix including, for each sender, estimated sender-receiver percentages; and for a given time period: determining current actual costs for each sender to receivers; and determining estimated cost allocations for each receiver in the organization based on a function of the current actual costs for each sender and using the sender-receiver percentages matrix; and providing, for presentation to a user, a report that includes the estimated cost allocations.

The foregoing and other implementations can each optionally include one or more of the following features, alone or in combination. In particular, one implementation can include all the following features:

In a first aspect, combinable with any of the previous aspects, further comprising creating vectors in a network, each node in the network corresponding to a cost center that is at least one of a sender or a receiver, and each vector in the network corresponding to a cost allocated from the sender to the receiver of the cost.

In a second aspect, combinable with any of the previous aspects, further comprising: determining an accuracy of a given estimated cost allocation based at least in part on outlier information, including new and removed cost centers; and providing, with the report, the accuracy associated with the given estimated cost allocation.

In a third aspect, combinable with any of the previous aspects, wherein consolidating the transactions into estimated sender-receiver totals includes using weighted transactions, and wherein a given sender-receiver total is based on the weighted transactions.

In a fourth aspect, combinable with any of the previous aspects, wherein weights used for weighted transactions are assigned based on a recency of the time periods.

In a fifth aspect, combinable with any of the previous aspects, wherein weights used for the weighted transactions are assigned based on cyclical periods that are similar to the given time period.

In a sixth aspect, combinable with any of the previous aspects, wherein consolidating transactions into the estimated sender-receiver totals optionally excludes reversals.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 2 is a block diagram showing an example of a conventional process for cost allocation processing.

FIG. 3 is a block diagram showing an example of a streamlined process having a reduced processing time with acceptable accuracy for estimating cost allocations.

Like reference numbers and designations in the various drawings indicate like elements.

DETAILED DESCRIPTION

Figure 1:
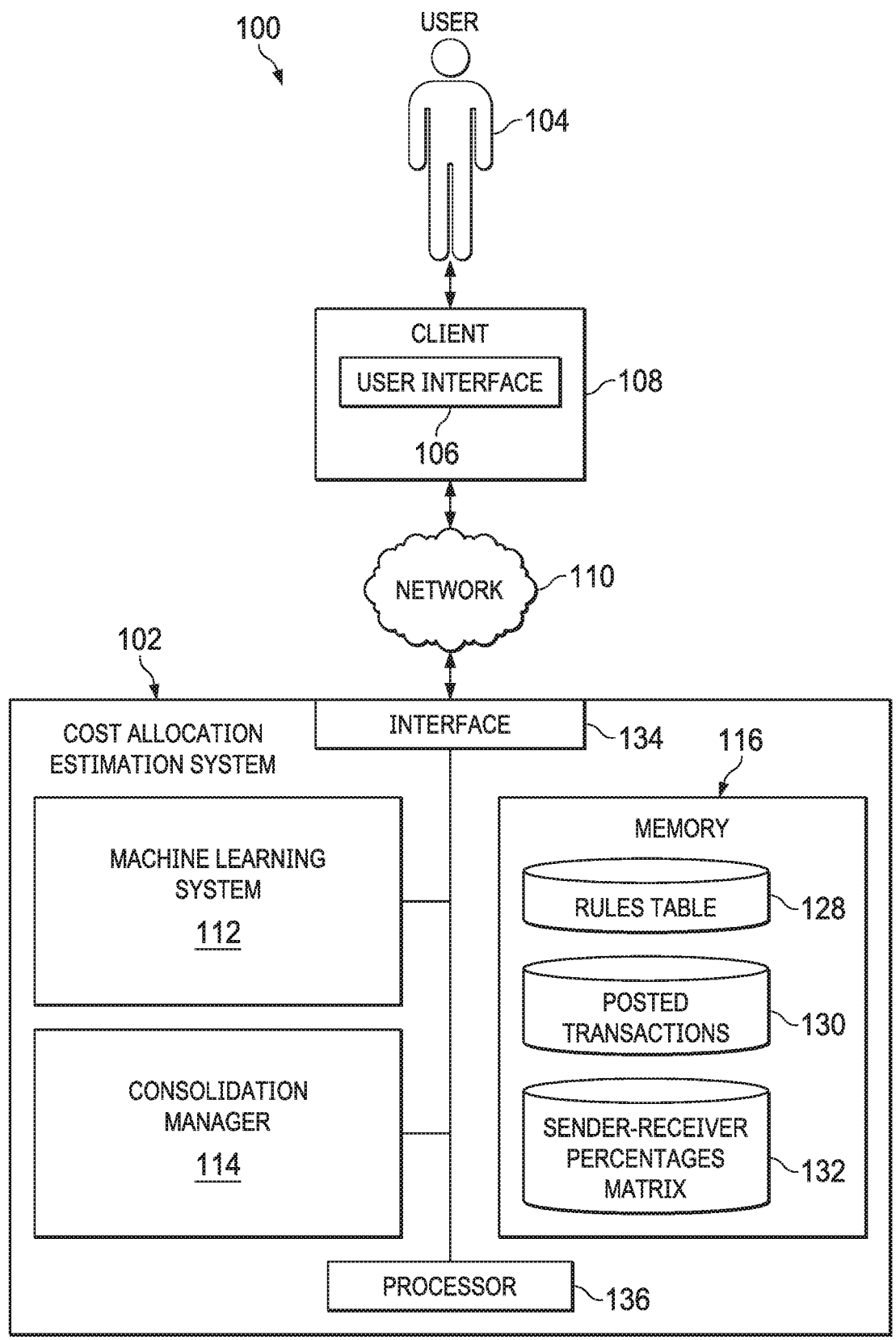
FIG. 1 is a block diagram of an example environment that includes a cost allocation estimation system for estimating cost allocations using direct cost vectors and machine learning techniques.

The present disclosure describes computer-implemented methods, software, and systems for estimating cost allocations using direct cost vectors and machine learning. Controlling (CO) allocations, or cost allocations, are part of most companies' closing processes, such as at month-end or year-end. At some large enterprises, the total processing time of the allocation cycles can be more than 24 hour. In some time periods, such as non-quarterly months, some enterprises do not need a complete, 100%-accurate closing that may typically be required quarterly, for example, but may need information in a timely manner. For this reason, and in order to save time and resources, some enterprises will accept a less accurate result that can be achieved more quickly with less effort and fewer resources.

In some implementations, direct path allocation techniques can be used to provide CO allocations. Instead of performing detailed CO allocations, machine learning (ML) algorithms can be used to detect underlying patterns within the allocations that have been performed in previous periods and directly calculate expected results, including identifying and using direct cost vectors from a sender to an ultimate receiver. Because current data can vary significantly from historic data, historic data can be weighted in order to generate more accurate estimated cost allocations. Machine learning techniques can use allocation cycle definitions (for example, in the form of vectors and networks) and weighted historical data.

In some implementations, data that is required for the learning component of the ML engine can include all postings (for example, posted by sender objects) of a period (to be cost-allocation estimated) which are compared to the postings created by the allocations. The senders (for example, combinations of cost centers and accounts) and the receivers (other combinations of cost centers and accounts) can be specified in the cycle definition of the allocations. At least on a percentage level, for example, it can be determined that allocations typically do not change frequently from period to period. As a result, historic data that is available from productive systems can be used for the machine learning. The data and its use in machine learning can affect a confidence coefficient associated with the use of customer data in generating estimated cost allocations.

The techniques described in this disclosure can provide the following benefits. Conventional month-end processes that normally take too long can be replaced with estimated results. Return on investment (ROI) can be performed with fewer costs, as fewer controllers are needed to monitor processes. Processes that create estimated cost allocations can support predictive accounting, including answering questions regarding expected closing figures. These results can be achieved by learning from past allocations and by not having to calculate current allocations in detail. Estimated or expected results can be derived from a network (made-up from sender-receiver vectors) and weighted with historic data. Using this combinative approach, some long-running cycles do not need to be executed by enterprises. Moreover, the techniques can be used during transactional data recording in order to generate closing on-the-fly.

In some implementations, techniques that are used for estimating cost allocations using direct cost vectors and machine learning can include the following steps. Sender/receiver information of allocation cycles can be transformed into vectors. The sender can represent the starting point of a cost, and the receiver can represent the ending point of the cost. The vectors can be used to generate a network. Lines connecting nodes representing senders and receivers can represent amounts transferred between sender and receiver. The thickness of a line can indicate a relative amount of the cost. The network of vectors can be used to trace costs between senders and receivers from any given starting point to any given ending point. A new network can be created for every period, such as a month or other processing or accounting period. A resulting estimation of an amount for a given sender sent to a given receiver can be weighted by historic data from previous existing combinations of cost centers and accounts, including using weighted or unweighted averaging. Using this data, the allocation cycle during month end does not need to be executed in detail but can skip the extensive computation time by referring to the tuples that are generated, for example, by consolidating transactions by cost center and account for sender and receivers.

Enterprises or customers can use this approach, for example, in parallel with the conventional ways of processing allocation cycles, to predict expected closing figures. The approach of transforming the sender-receiver-combinations into vectors and combining them to a network can facilitate identification of predecessors or successors associated with every posting that is to be used in predicted or estimated cost allocations. Machine learning (ML) algorithms can use allocation cycle definitions, and weights can be used to generate predicted data.

The techniques described in the present disclosure can provide the following advantages. First, customers can be provided with closing cost allocations that are faster than conventional cost allocation closing processes (for example, at month-end) and can provide information that includes customer-accepted levels of accuracy. Second, the cost allocations can be based on machine learning (ML), pattern recognition, weighting of historical information, and actual cost postings. Third, machine learning techniques can use a combination of standard statistical derivation (including linear weighted and unweighted derivation for future figures from historic figures) and core machine learning capabilities. Fourth, sender-receiver cost combinations can be transformed into vectors and combined into a network. Fifth, a predecessor or successor for every posting that needs to be predicted can be identified. Sixth, ML techniques can be provided with allocation cycle definitions and weighting of predicted data. Seventh, resulting networks can be used to create allocation postings on-the-fly when recording transactional data (primary postings), eliminating the need for a closing step of allocations. Eighth, maintenance efforts can be reduced as ML algorithms train themselves and becomes better over time. Ninth, the training of ML models can occur outside of month-end and other closing or peak times, freeing-up critical resources during the closing. Tenth, processes that estimate cost allocations using direct cost vectors and machine learning can be completed faster than classical CO cycles, and closing steps can start earlier, reducing the time needed to close books.

FIG. 1 is a block diagram of an example environment 100 that includes a cost allocation estimation system 102 for estimating cost allocations using direct cost vectors and machine learning techniques. The cost allocation estimation system 102 can be used, for example, by a user 104 for generating estimated cost allocations for specific time period. The estimated cost allocations can be based on historical cost posting information, including patterns that are obtained through machine learning. The historical cost posting information can be converted into direct path vectors that can, for example, track a cost from a sender to an ultimate receiver. The user 104 can use or interact with a user interface (UI) 106. The UI 106 can be associated with one or more applications that run on a client 108 (e.g., a mobile device, laptop computer, or other computing device) to interact with the cost allocation estimation system 102. A network 110 (for example, the Internet) can support communication among the components of the environment 100.

The cost allocation estimation system 102 includes a machine learning system 112 that can be used to analyze posted transactions 130 and resulting cost allocations from previous periods to produce path vectors that, for example, track a cost from a sender to an ultimate receiver. The machine learning system 112 can use a rules table 128 that includes rules defining how costs travel through an organization and used to determine how costs are ultimately allocated. A consolidation manager 114 can consolidate transactions learned by the machine learning system 112 into sender-receiver totals for costs transmitted by senders to receivers in an organization. The cost allocation estimation system 102 can produce a sender-receiver percentages matrix 132 that is determined from the estimated sender-receiver totals of a given sender and for each receiver of the transactions from the given sender. The sender-receiver percentages matrix 132 includes, for each sender, estimated sender-receiver percentages. The cost allocation estimation system 102 can determine current actual sender-receiver costs for a given time period, for example, based on actual cost postings. The cost allocation estimation system 102 can then determine estimated cost allocations for a given time period using the machine learning cost-receiver percentage matrix. The estimated cost allocations are determined for each receiver in the organization based on a function of the current actual costs for each sender. The cost allocation estimation system 102 can provide a report (for example, for presentation to the user 104) that includes the estimated cost allocations. The report that is produced can be, for example, an estimated cost allocation report for an entire organization (for a given time period, such as a month) or a report that includes estimates for specific cost centers. The report can be part of, or separate from, conventional reporting functionalities.

The cost allocation estimation system 102 includes a memory 116. The memory 116 can store the rules table 128, the posted transactions 130, and the sender-receiver percentages matrix 132.

The cost allocation estimation system 102 includes an interface 134 for receiving inputs and for transmitting responses. At least one processor 136 can execute instructions of modules and other components of the cost allocation estimation system 102.

FIG. 2 is a block diagram showing an example of a conventional process 200 for cost allocation processing. The conventional process 200 can be used by conventional systems that, at least quarterly, for example, fully process each cost-related posting to determine exact results. The conventional process 200 shows allocations 202 of costs from multiple senders 204 to multiple receivers 206. The multiple senders 204 include multiple combinations of cost centers and accounts for senders. The multiple receivers 206 include multiple combinations of cost centers and accounts for receivers. As indicated by complex, looping lines of the allocations 202 (indicating multiple allocation cycle definitions), individual costs can pass through multiple cost centers when sent between particular ones of N multiple senders 204 to particular ones of M multiple receivers 206. Because of this complexity, according to a timeline 208, the conventional process 200 can require several hours (h) to complete. The total time (e.g., 36 hours) can include, for example, four hours to read the data, 26 hours to process cost allocations, and six hours to write data results. While the conventional process 200 may be required for quarterly use by some enterprises, some enterprises may instead use processes described in the present disclosure (for example, FIG. 3) that provide acceptable estimates and provide quicker results.

FIG. 3 is a block diagram showing an example of a streamlined process 300 having a reduced processing time with acceptable accuracy for estimating cost allocations. The streamlined process 300 can be used, for example, by systems described in the present disclosure to more quickly estimate cost allocations as an alternative to the conventional method of running full processing to return 100% accurate results. The streamlined process 300 shows allocations 302 of costs from multiple senders 304 to multiple receivers 306. The multiple senders 304 include multiple combinations of cost centers and accounts for senders. The multiple receivers 306 include multiple combinations of cost centers and accounts for receivers. As indicated by straight lines of the allocations 302, indicating single posting definitions, individual costs are more easily definable between particular ones of N multiple senders 304 to particular ones of M multiple receivers 306. Because of this reduced complexity, and according to a timeline 308, the streamlined process 300 can require fewer hours to complete than the conventional process 200. An estimated total time (e.g., 20 hours) can include, for example, four hours to read the data, ten hours to process cost allocations, and six hours to write data results. An estimated ten-hour cost allocation processing time, for example, can be less than 40% of the processing time needed for the conventional process 200.

Figure 4:
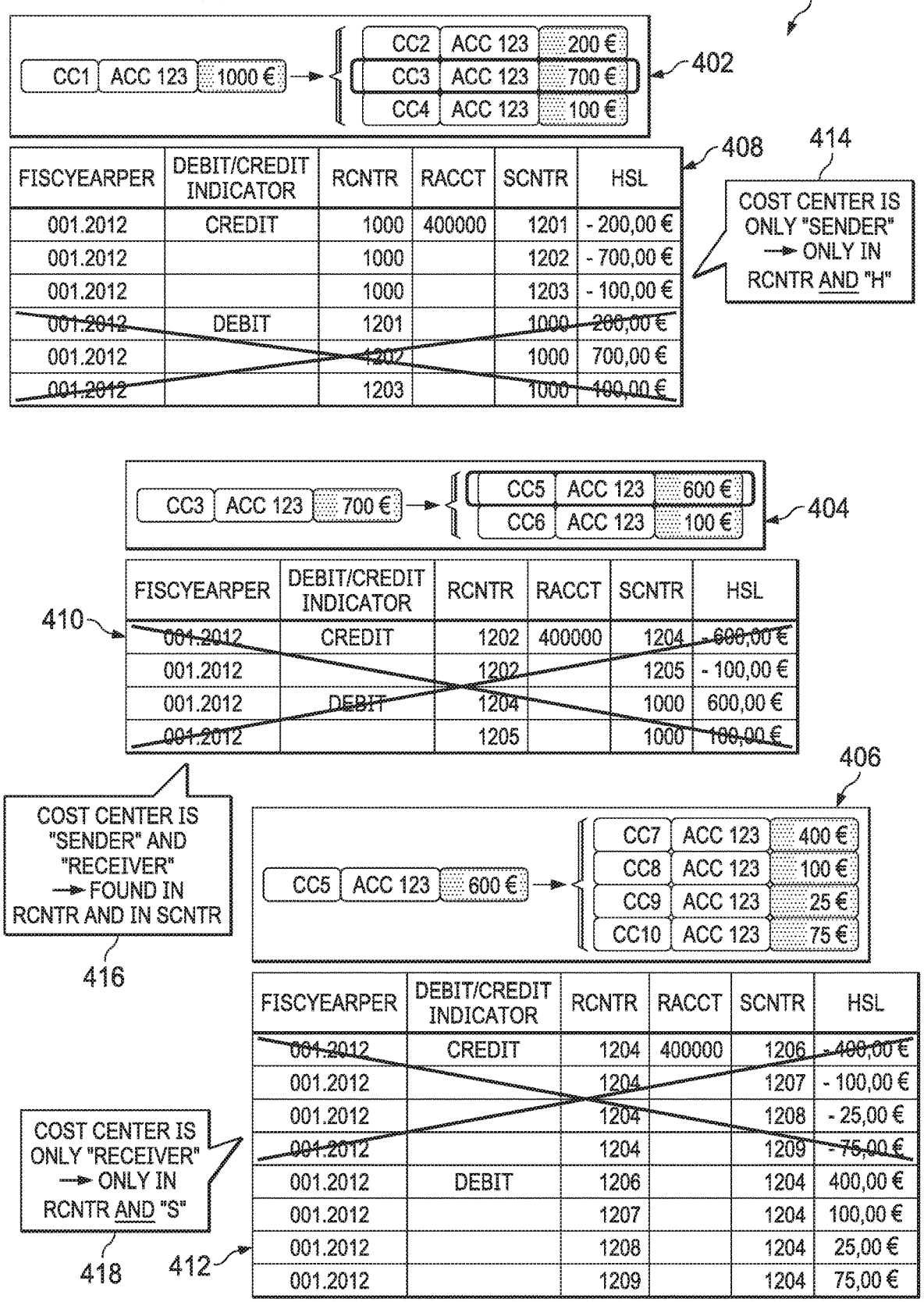
FIG. 4 is a block diagram showing an example of a scenario with costs sent from senders to sender-receivers and receivers.

FIG. 4 is a block diagram showing an example of a scenario 400 with costs sent from senders to sender-receivers and receivers. For example, as shown by allocations 402-406, the total of 1000 Euros (€) for cost center (CC) 1 for account 123 is allocated into 200€, 700€, and 100€ for CC's 2, 3, and 4, respectively. In this example, as shown in the allocation 402, CC1 is a sender cost center, CC2 and CC4 are receiver cost centers, and CC3 is a sender-receiver. For example, as shown in the allocation 404, the 700€ for CC3 is allocated to CC5 (600€) and CC6 (100€), where CC6 is a receiver cost center and CC5 is a sender-receiver cost center. For example, as shown in the allocation 402, the 600€ for CC5 is allocated to receiver cost centers CC7 (400€), CC8 (100€), CC9 (25€), and CC10 (75€). Individual transactions 408-412 include details for the cost allocations. Crossed-out portions of the individual transactions 408-412 indicate transactions (or cost postings) that can be ignored by the streamlined process 300, for example, when transaction information to generate estimated cost allocations. As indicated by note 414, a cost center is only identified as a sender in the individual transactions 408 when the amounts are negative and Debit/Credit is Credit. As indicated by note 416-418, cost centers are identified as sender, sender-receiver, or receiver in individual transactions 408-412, where individual transactions not needed for the streamlined process 300 are crossed out.

Figure 5:
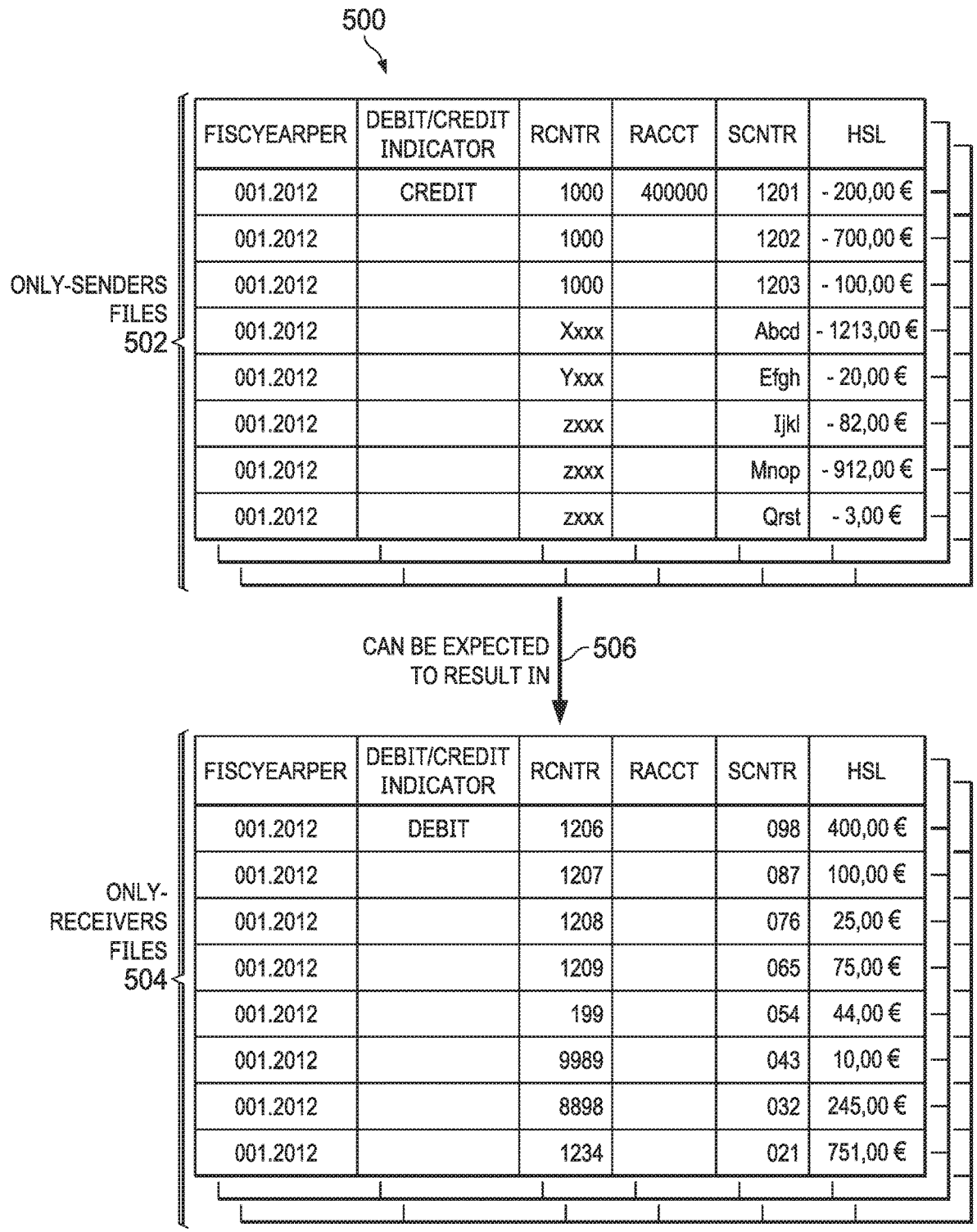
FIG. 5 is a block diagram showing an example of an expectation scenario that identifies expected receiver-only transactions given a set of sender-only transactions.

FIG. 5 is a block diagram showing an example of an expectation scenario 500 that identified expected receiver-only transactions 504 given a set of sender-only transactions 502. The expected receiver-only transactions 504 can be identified, for example, based on historical information for the set of sender-only transactions 502. The historical information can be from previous periods occurring before a period for which estimates are to be made. Expectation 506 can be interpreted as "if the sender-only transactions 502 amounts exist for these cost centers in past periods, then the receiver-only transactions 504 amounts can be expected for these cost centers in the next period."

Figure 6:
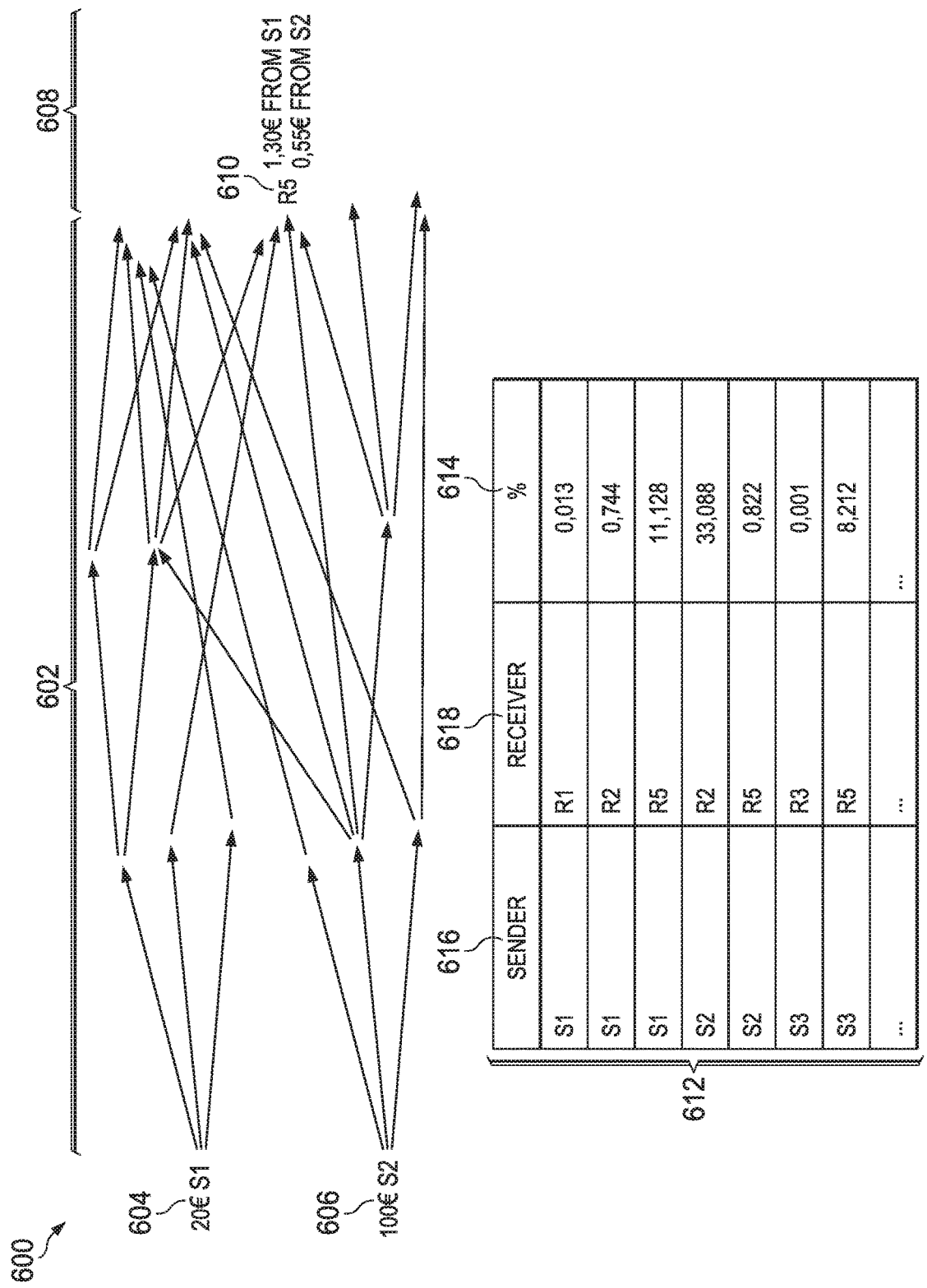
FIG. 6 is a network showing an example of cost vectors.

FIG. 6 is a network 600 showing an example of cost vectors 602. For example, the cost vectors 602 originating from a sender node ("S1") 604 and a sender node ("S2") 606 having costs of 20€ and 100€, respectively. The cost vectors 602 include intermediate sender-receiver nodes, but ultimately terminate at receiver nodes 608. For example, the receiver nodes 608 can include a receiver node "R5" 610 having cost allocations from the sender node ("S1") 604 and the sender node ("S2") 606. Information from sender nodes and receiver nodes can be used to generation a percentage allocation table 612. The percentage allocation table 612 can include sender-receiver percentages 614 that identify, for a given sender 616, different cost percentages for the given sender 616 that are allocated to different receivers 618.

Figure 7:
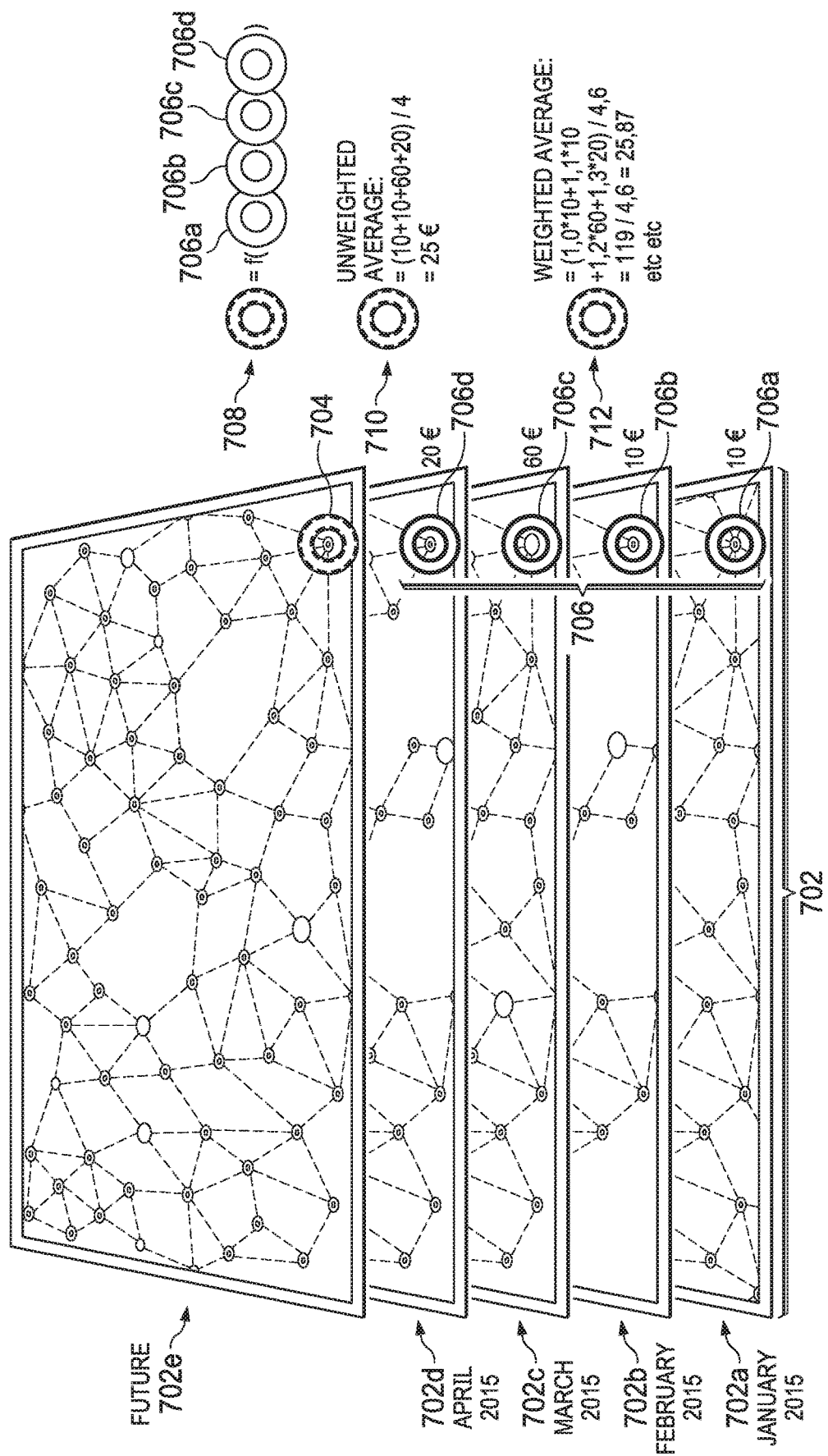
FIG. 7 is a block diagram showing examples of networks used in estimating cost allocations for a node based on an average of previous costs allocated to the node.

FIG. 7 is a block diagram showing examples of networks 702 used in estimating cost allocations for a node based on an average of previous costs allocated to the node. Nodes in the networks 702 correspond to senders and receivers, and lines in the network identify costs sent from a sender node to a receiver node. More specifically, each line in the networks 702 can represent a total of costs sent from one node to another node in a given period. For example, the networks 702 include a stack of networks 702a-702d corresponding to 2015 months of January-April, respectively. A node that appears in a network 702 for one month may not appear in a network 702 for a previous or a subsequent month. In some implementations, costs can be estimated for a future month, represented by a network 702e. Not all of the same nodes appear in subsequent months represented by the networks 702a-702d, for example, as costs can change from month-to-month. However, some cost estimates for a cost allocation of a node 704 can be based on cost allocations for nodes 706 in previous periods that correspond to the same cost center.

The networks 702a-702b each include a node 706, which is a receiver node, over each of the months January to April. In some implementations, an estimated cost allocation for the node 704 (for example, May, 2015) can be a function 708 of the costs of nodes 706a-706d. For example, the function 708 can be an unweighted average 710 of a weighted average 712. However, these types of averages may not provide estimates with an acceptable accuracy.

Figure 8:
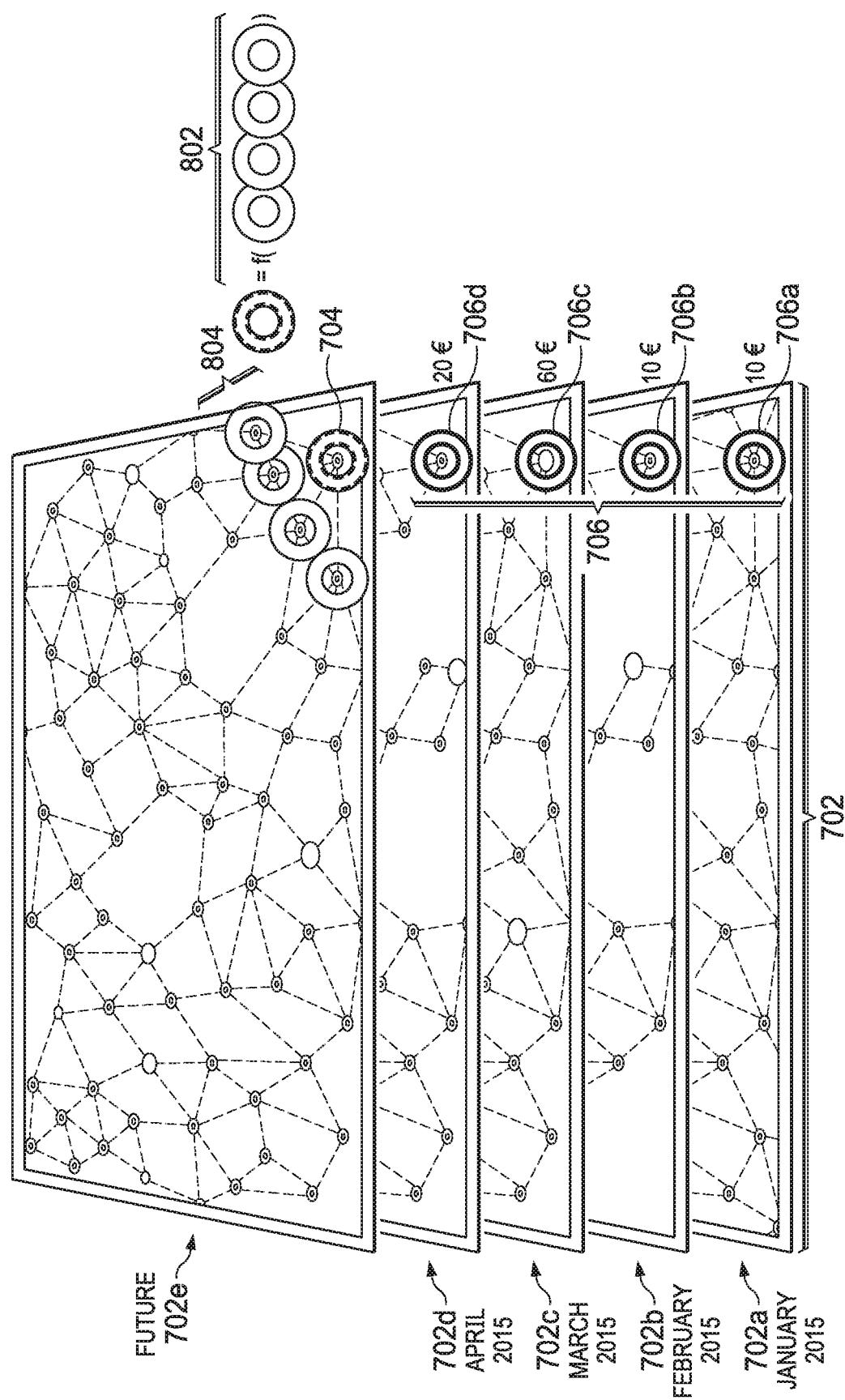
FIG. 8 is a block diagram showing examples of the networks used in estimating cost allocations for a node based on sender nodes for the node.

FIG. 8 is a block diagram showing examples of the networks 702 used in estimating cost allocations for a node based on sender nodes for the node. In this example, a function 802 is based on sender nodes 804. For example, the function 802 can be used to estimate cost allocations for the node 704 based on a previous history of cost allocations from the sender nodes 804.

Figure 9:
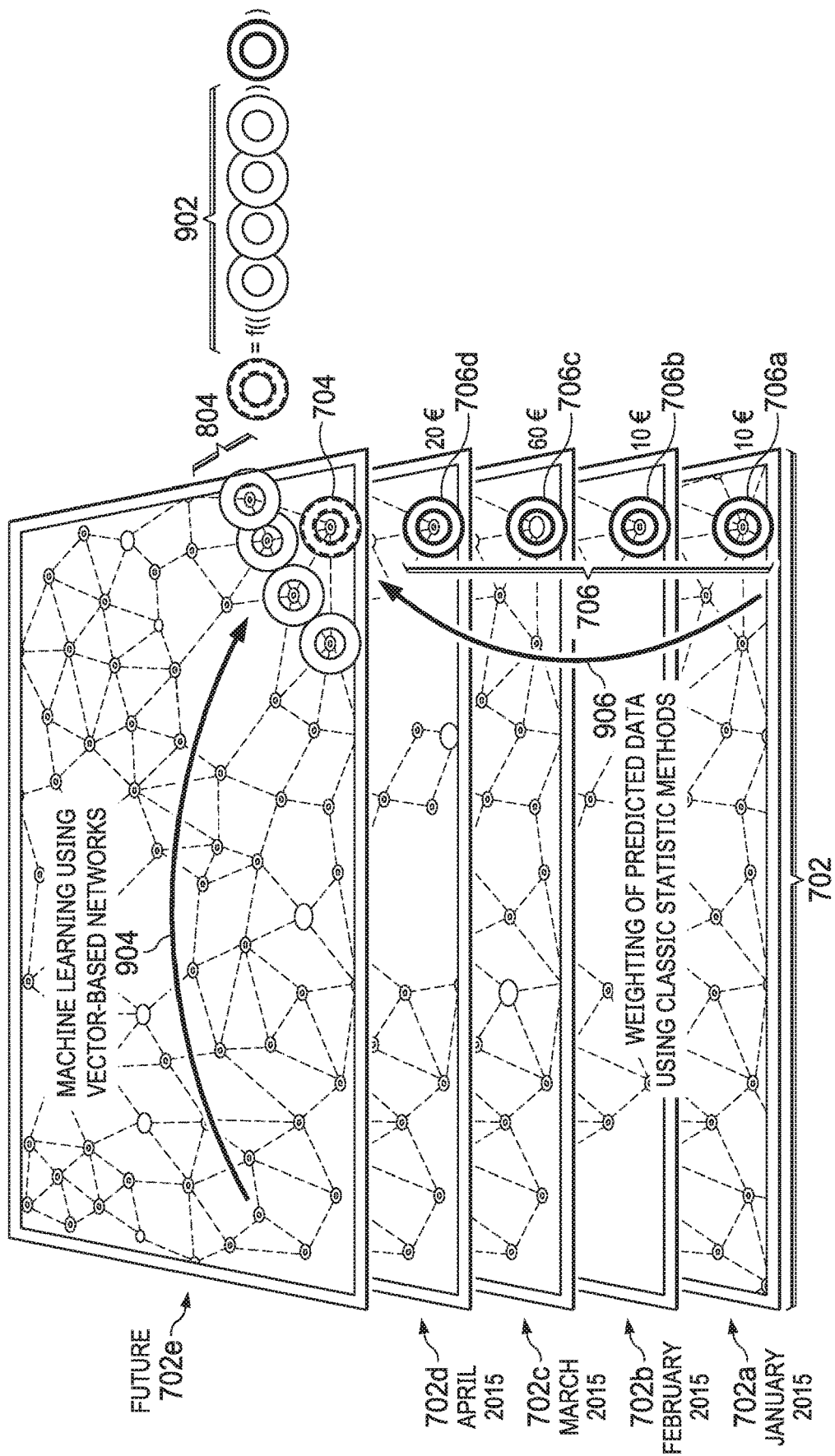
FIG. 9 is a block diagram showing examples of the networks used in estimating cost allocations for a node based on sender nodes for the node and machine learning.

FIG. 9 is a block diagram showing examples of the networks 702 used in estimating cost allocations for a node based on sender nodes for the node and machine learning. In this example, a function 902 is based in part on machine learning 904 that is performed on the networks 702, resulting in cost allocation information for the sender nodes 804. The function 902 is also based in part on weightings of cost allocations for the node 706 from previous time periods.

Figure 10:
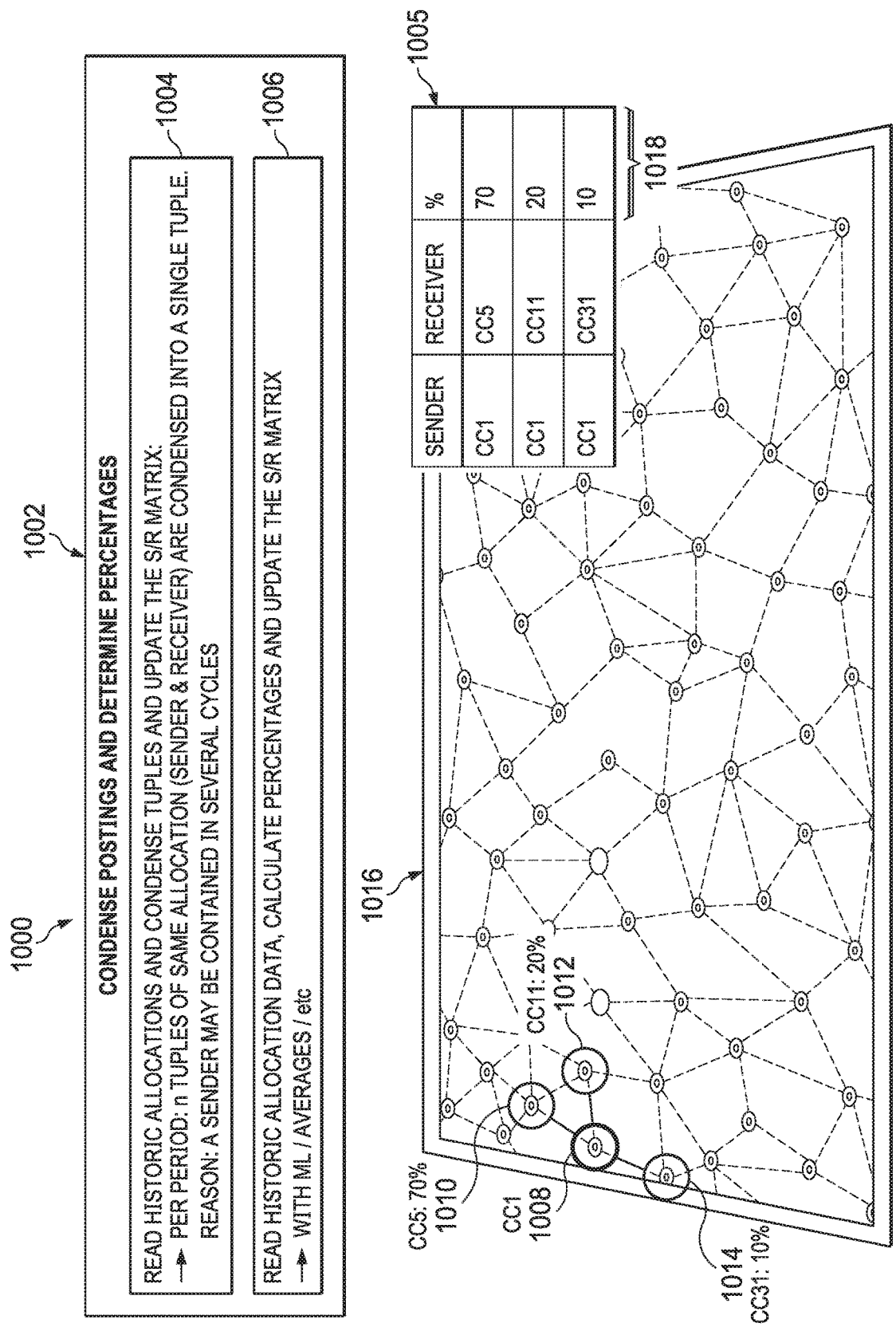
FIG. 10 is a block diagram showing an example of a processing step to condense postings and determine percentages in a cost allocation estimation process.

FIG. 10 is a block diagram showing an example of a processing step 1002 to condense postings and determine percentages in a cost allocation estimation process 1000. The processing step 1002 includes a sub-step 1004 for reading historic allocations, condensing tuples, and updating a sender/receiver (S/R) matrix 1005. For example, the historic allocations can be determined from networks associated with past time periods, such as January-April, 2015. In this way, costs allocated to a given sender can be included when a sender is contained in several time periods (or cycles). On a per period basis, n tuples of a same sender-receiver allocation (for example, CC1-CC5) are condensed into a single tuple. For example, a CC1 sender 1008, a CC5 receiver 1010, a CC11 receiver 1012, and a CC31 receiver 1014 are part of a network 1016 (that considers costs from multiple previous time periods).

After the sub-step 1004, a sub-step 1006 includes reading historic allocation data, using machine learning (ML), and using averages to calculate percentages, and updating the S/R matrix 1005. For example, the S/R matrix 1005 can be updated with rows including historic percentages 1018 of 70%, 20%, and 10%, corresponding the CC5 receiver 1010, the CC11 receiver 1012, and the CC31 receiver 1014, respectively. A network creation step can follow the processing step 1002. The network creation step can include reading a current month's postings to populate the network 1016.

Figure 11:
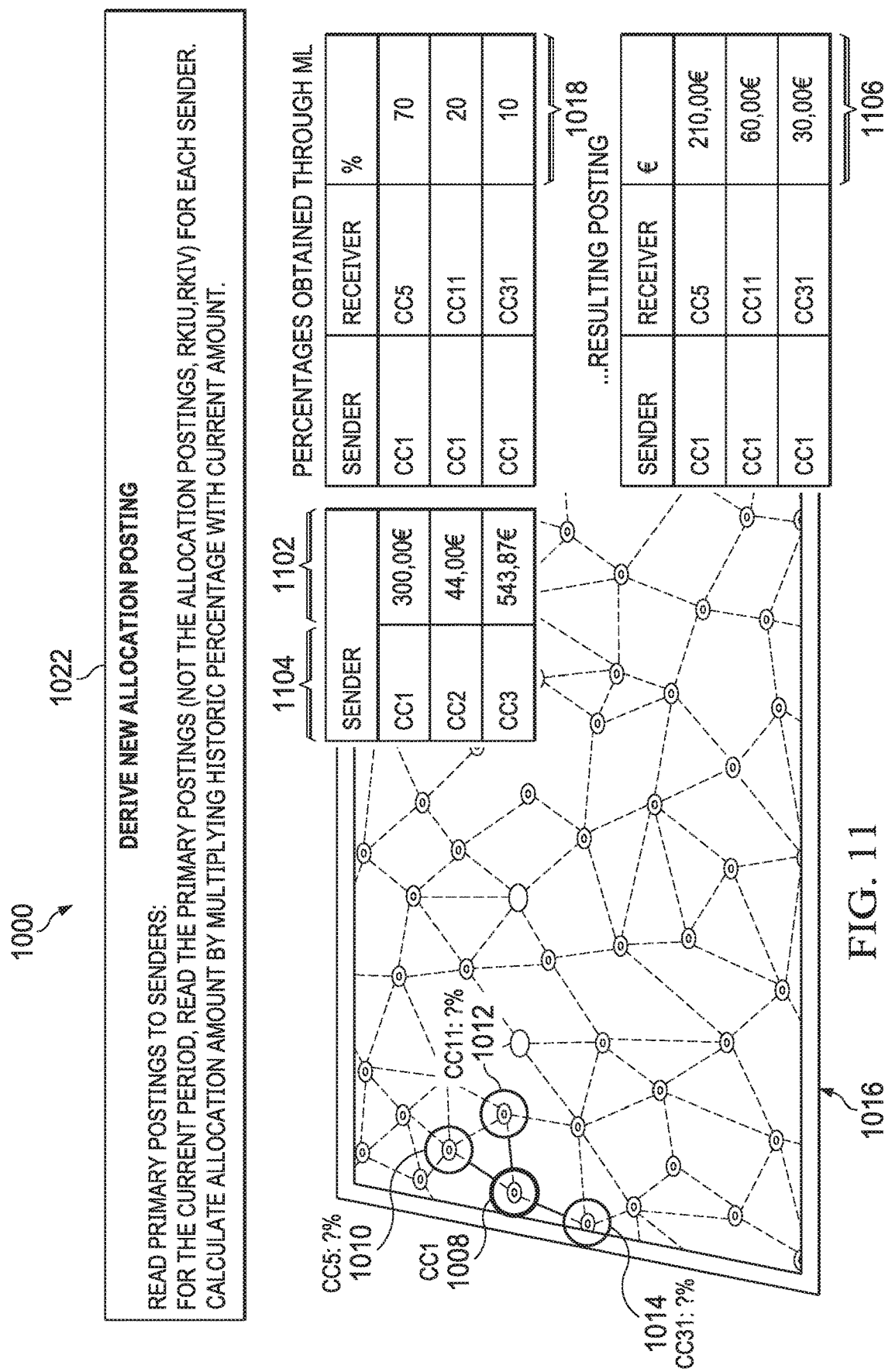
FIG. 11 is a block diagram showing an example of an allocation posting estimation step in a cost allocation estimation process.

FIG. 11 is a block diagram showing an example of an allocation posting estimation step 1022 in a cost allocation estimation process 1000. For example, for the current period, primary postings 1102 (not the allocation postings) are read for each sender 1104. Estimated allocation amounts 1106 (which are estimates) are calculated by multiplying historic percentages 1018 with current amount (of the primary postings 1102). For example, using the historic percentages 1018 of 70%, 20%, and 10%, corresponding the CC5 receiver 1010, the CC11 receiver 1012, and the CC31 receiver 1014, respectively, the estimated allocation amounts 1106 of 210€, 60€, and 30€ are determined.

Figure 12:
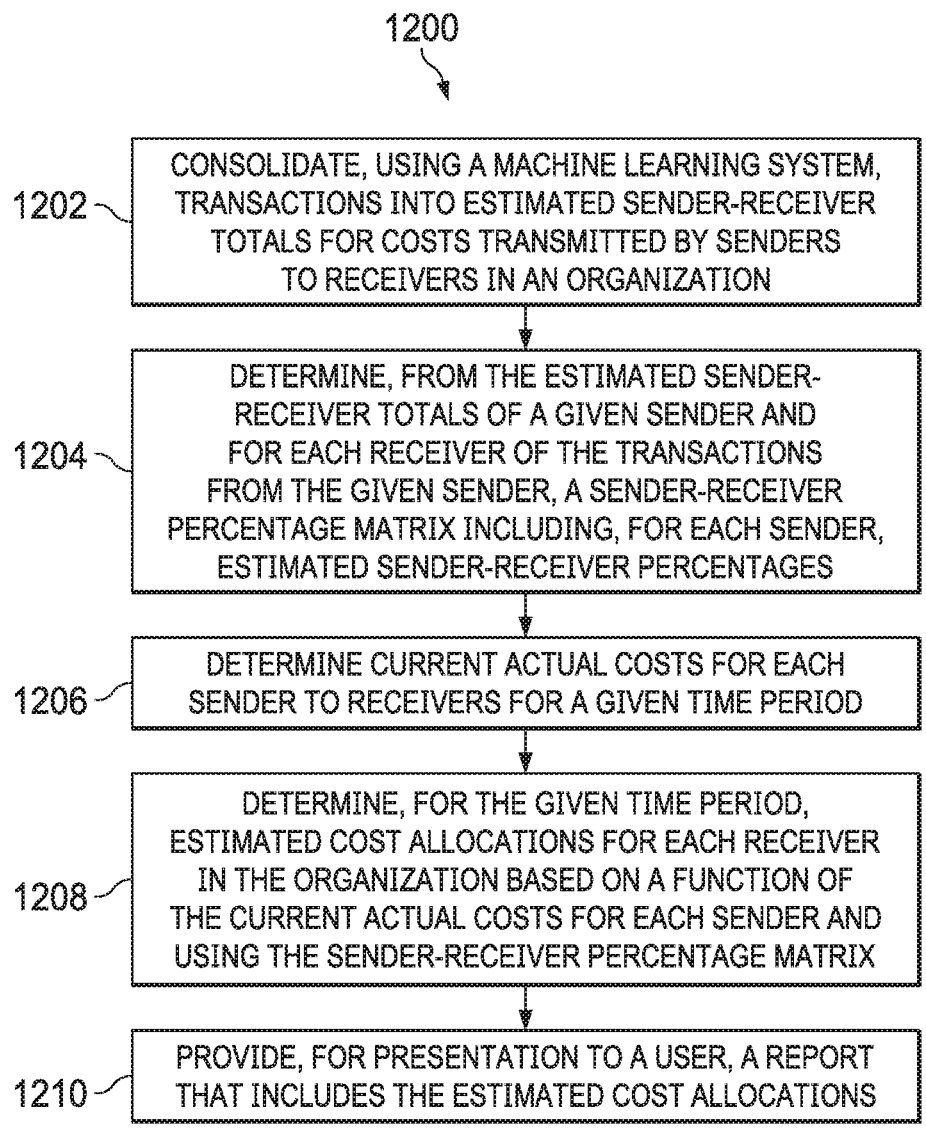
FIG. 12 is a flowchart of an example method for estimating cost allocations using direct cost vectors and machine learning.

FIG. 12 is a flowchart of an example method 1200 for estimating cost allocations using direct cost vectors and machine learning. Method 1200 can be performed by the cost allocation estimation system 102, for example. For clarity of presentation, the description that follows generally describes method 1200 in the context of FIG. 1.

At 1202, using a machine learning system, transactions are consolidated into estimated sender-receiver totals for costs transmitted by senders to receivers in an organization. For example, cost allocation estimation system 102 can use ML techniques for costs associated with the networks 702. In some implementations, consolidating the transactions into estimated sender-receiver totals includes using weighted transactions, and where a given sender-receiver total is based on the weighted transactions. For example, weights used for weighted transactions are assigned based on a recency of the time periods. In another example, weights used for the weighted transactions are assigned based on cyclical periods that are similar to the given time period. In some implementations, consolidating transactions into the estimated sender-receiver totals excludes reversals, for example, if experience over time indicates that reversals are to be ignored.

At 1204, a sender-receiver percentages matrix is determined from the estimated sender-receiver totals of a given sender and for each receiver of the transactions from the given sender. The sender-receiver percentages matrix includes, for each sender, estimated sender-receiver percentages. The cost allocation estimation system 102, for example, can generate the sender-receiver percentages matrix 122 that includes percentages such as the historic percentages 1018 of 70%, 20%, and 10%, corresponding the CC5 receiver 1010, the CC11 receiver 1012, and the CC31 receiver 1014, respectively. Steps 1202 and 1204 can be performed, for example, during a setup phase, such as when implementing the system at a customer side. The steps can ideally be repeated periodically to maintain complete and accurate lists of sender/receiver combinations and percentages.

At 1206, current actual costs are determined for each sender to receivers for a given time period. For example, the cost allocation estimation system 102 can access posting for a given time period to obtain the primary postings 1102.

At 1208, estimated cost allocations are determined for given time period using the machine learning cost-receiver percentage matrix. The estimated cost allocations are determined for each receiver in the organization based on a function of the current actual costs for each sender. The cost allocation estimation system 102, for example, can use the historic percentages 1018 of 70%, 20%, and 10%, corresponding the CC5 receiver 1010, the CC11 receiver 1012, and the CC31 receiver 1014, respectively, to determine the estimated allocation amounts 1106 of 210€, 60€, and 30€.

Steps 1206 and 1208, for example, can be part of a closing process at each month-end once the system is up and running.fcloud At 1210, a report that includes the estimated cost allocations is provided for presentation to a user. As an example, the cost allocation estimation system 102 can provide estimated cost allocations for presentation to the user 104. The resulting amounts from the new allocations which are debited to the receivers and credited to the senders, can be included in standard month end reports.

In some implementations, method 1200 can further include comprising creating vectors in a network, each node in the network corresponding to a cost center that is at least one of a sender or a receiver, and each vector in the network corresponding to a cost allocated from the sender to the receiver of the cost. For example, the cost allocation estimation system 102 can create the vectors that are part of the networks 702.

In some implementations, method 1200 can further include determining an accuracy of a given estimated cost allocation based at least in part on outlier information, including new and removed cost centers; and providing, with the report, the accuracy associated with the given estimated cost allocation. For example, with the report that the cost allocation estimation system 102 provides to the user 104, the report can include information that indicates expected reliabilities or accuracies of cost allocations in the report. In some implementations, the cost allocation estimation system 102 can identify specific cost postings that contribute to potential inaccuracies in the cost allocations.

Figure 13:
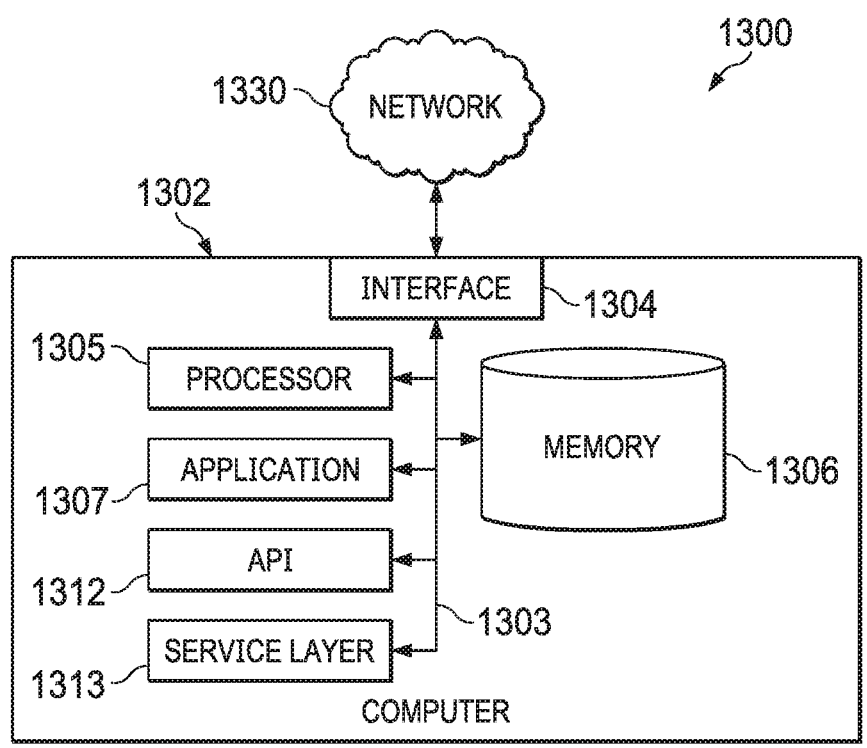
FIG. 13 is a block diagram of an exemplary computer system used to provide computational functionalities associated with described algorithms, methods, functions, processes, flows, and procedures as described in the instant disclosure.

FIG. 13 is a block diagram of an exemplary computer system 1300 used to provide computational functionalities associated with described algorithms, methods, functions, processes, flows, and procedures as described in the instant disclosure.

The illustrated computer 1302 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1302 may comprise a computer that includes an input device, such as a keypad, keyboard, touch screen, or other device that can accept user information, and an output device that conveys information associated with the operation of the computer 1302, including digital, visual, or audio information (or a combination of information), or a graphical user interface (GUI).

The computer 1302 can serve in a role as a client, network component, a server, a database or other persistency, or any other component (or a combination of roles) of a computer system for performing the subject matter described in the instant disclosure. The illustrated computer 1302 is communicably coupled with a network 1330. In some implementations, one or more components of the computer 1302 may be configured to operate within environments, including cloud-computing-based, local, global, or other environment (or a combination of environments).

At a high level, the computer 1302 is an electronic computing device operable to receive, transmit, process, store, or manage data and information associated with the described subject matter. According to some implementations, the computer 1302 may also include or be communicably coupled with an application server, e-mail server, web server, caching server, streaming data server, business intelligence (BI) server, or other server (or a combination of servers).

The computer 1302 can receive requests over network 1330 from a client application (for example, executing on another computer 1302) and respond to the received requests by processing those requests in an appropriate software application. In addition, requests may also be sent to the computer 1302 from internal users (for example, from a command console or by other appropriate access method), external or third-parties, other automated applications, as well as any other appropriate entities, individuals, systems, or computers.

Each of the components of the computer 1302 can communicate using a system bus 1303. In some implementations, any or all of the components of the computer 1302, both hardware or software (or a combination of hardware and software), may interface with each other or the interface 1304 (or a combination of both) over the system bus 1303 using an API 1312 or a service layer 1313 (or a combination of the API 1312 and service layer 1313). The API 1312 may include specifications for routines, data structures, and object classes. The API 1312 may be either computer-language independent or dependent and refer to a complete interface, a single function, or even a set of APIs. The service layer 1313 provides software services to the computer 1302 or other components (whether or not illustrated) that are communicably coupled to the computer 1302. The functionality of the computer 1302 may be accessible for all service consumers using this service layer. Software services, such as those provided by the service layer 1313, provide reusable, defined business functionalities through a defined interface. For example, the interface may be software written in JAVA, C++, or other suitable language providing data in extensible markup language (XML) format or other suitable format. While illustrated as an integrated component of the computer 1302, alternative implementations may illustrate the API 1312 or the service layer 1313 as stand-alone components in relation to other components of the computer 1302 or other components (whether or not illustrated) that are communicably coupled to the computer 1302. Moreover, any or all parts of the API 1312 or the service layer 1313 may be implemented as child or sub-modules of another software module, enterprise application, or hardware module without departing from the scope of the instant disclosure.

The computer 1302 includes an interface 1304. Although illustrated as a single interface 1304 in FIG. 13, two or more interfaces 1304 may be used according to particular needs, desires, or particular implementations of the computer 1302. The interface 1304 is used by the computer 1302 for communicating with other systems in a distributed environment that are connected to the network 1330 (whether illustrated or not). Generally, the interface 1304 comprises logic encoded in software or hardware (or a combination of software and hardware) and operable to communicate with the network 1330. More specifically, the interface 1304 may comprise software supporting one or more communication protocols associated with communications such that the network 1330 or interface's hardware is operable to communicate physical signals within and outside of the illustrated computer 1302.

The computer 1302 includes a processor 1305. Although illustrated as a single processor 1305 in FIG. 13, two or more processors may be used according to particular needs, desires, or particular implementations of the computer 1302. Generally, the processor 1305 executes instructions and manipulates data to perform the operations of the computer 1302 and any algorithms, methods, functions, processes, flows, and procedures as described in the instant disclosure.

The computer 1302 also includes a memory 1306 that holds data for the computer 1302 or other components (or a combination of both) that can be connected to the network 1330 (whether illustrated or not). For example, memory 1306 can be a database storing data consistent with this disclosure. Although illustrated as a single memory 1306 in FIG. 13, two or more memories may be used according to particular needs, desires, or particular implementations of the computer 1302 and the described functionality. While memory 1306 is illustrated as an integral component of the computer 1302, in alternative implementations, memory 1306 can be external to the computer 1302.

The application 1307 can be an algorithmic software engine providing functionality according to particular needs, desires, or particular implementations of the computer 1302, particularly with respect to functionality described in this disclosure. For example, application 1307 can serve as one or more components, modules, applications, etc. Further, although illustrated as a single application 1307, the application 1307 may be implemented as multiple applications 1307 on the computer 1302. In addition, although illustrated as integral to the computer 1302, in alternative implementations, the application 1307 can be external to the computer 1302. The application can be deployed, for example, as a Cloud solution, an on-premises solution, or a combination.

There may be any number of computers 1302 associated with, or external to, a computer system containing computer 1302, each computer 1302 communicating over network 1330. Further, the term "client," "user," and other appropriate terminology may be used interchangeably as appropriate without departing from the scope of this disclosure. Moreover, this disclosure contemplates that many users may use one computer 1302, or that one user may use multiple computers 1302.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments, and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Alternatively, software may include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a GUI. The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method for determining estimates of cost allocations, comprising:
consolidating, using a machine learning system, historical transactions for different time periods into estimated sender-receiver totals for costs transmitted by senders to receivers in an organization, the consolidating including weighting the historical transactions from different time periods using different weights that are assigned based on a recency of the time periods;
converting the historical transactions for multiple respective time periods into different vectors in different respective network graphs, each node in a respective network graph corresponding to a cost center that is at least one of a sender or a receiver, and each vector in the respective network graph corresponding to a cost allocated from the sender to the receiver of the cost during a respective time period;
determining, by the machine learning system, from the vectors and the estimated sender-receiver totals of a given sender and for each receiver of the transactions from the given sender, a sender-receiver percentages matrix including, for each sender, estimated sender-receiver percentages; and
for a given time period:
determining current actual costs for each sender to receivers; and
determining estimated cost allocations for each receiver in the organization based on a function of the current actual costs for each sender and using the sender-receiver percentages matrix by multiplying estimated respective sender-receiver percentages by corresponding actual costs for a given sender and receiver; and
providing, for presentation to a user, a report that includes the estimated cost allocations.

2. The computer-implemented method of claim 1, further comprising:
determining an accuracy of a given estimated cost allocation based at least in part on outlier information, including new and removed cost centers; and
providing, with the report, the accuracy associated with the given estimated cost allocation.

3. The method of claim 1, wherein weights used for the weighted transactions are assigned based on cyclical periods that are similar to the given time period.

4. The computer-implemented method of claim 1, wherein consolidating transactions into the estimated sender-receiver totals optionally excludes reversals.

5. A system comprising:
memory storing tables storing cases associating problems and solutions, and metadata identifying the use of the cases over time; and
a server performing operations comprising:
consolidating, using a machine learning system, historical transactions for different time periods into estimated sender-receiver totals for costs transmitted by senders to receivers in an organization, the consolidating including weighting the historical transactions from different time periods using different weights that are assigned based on a recency of the time periods;
converting the historical transactions for multiple respective time periods into different vectors in different respective network graphs, each node in a respective network graph corresponding to a cost center that is at least one of a sender or a receiver, and each vector in the respective network graph corresponding to a cost allocated from the sender to the receiver of the cost during a respective time period;
determining, by the machine learning system, from the vectors and the estimated sender-receiver totals of a given sender and for each receiver of the transactions from the given sender, a sender-receiver percentages matrix including, for each sender, estimated sender-receiver percentages; and
for a given time period:
determining current actual costs for each sender to receivers; and
determining estimated cost allocations for each receiver in the organization based on a function of the current actual costs for each sender and using the sender-receiver percentages matrix by multiplying estimated respective sender-receiver percentages by corresponding actual costs for a given sender and receiver; and
providing, for presentation to a user, a report that includes the estimated cost allocations.

6. The system of claim 5, the operations further comprising:
determining an accuracy of a given estimated cost allocation based at least in part on outlier information, including new and removed cost centers; and
providing, with the report, the accuracy associated with the given estimated cost allocation.

7. The system of claim 5, wherein weights used for the weighted transactions are assigned based on cyclical periods that are similar to the given time period.

8. The system of claim 5, wherein consolidating transactions into the estimated sender-receiver totals optionally excludes reversals.

9. A non-transitory computer-readable media encoded with a computer program, the computer program comprising instructions that when executed by one or more computers cause the one or more computers to perform operations comprising:
consolidating, using a machine learning system, historical transactions for different time periods into estimated sender-receiver totals for costs transmitted by senders to receivers in an organization, the consolidating including weighting the historical transactions from different time periods using different weights that are assigned based on a recency of the time periods;
converting the historical transactions for multiple respective time periods into different vectors in different respective network graphs, each node in a respective network graph corresponding to a cost center that is at least one of a sender or a receiver, and each vector in the respective network graph corresponding to a cost allocated from the sender to the receiver of the cost during a respective time period;
determining, by the machine learning system, from the vectors and the estimated sender-receiver totals of a given sender and for each receiver of the transactions from the given sender, a sender-receiver percentages matrix including, for each sender, estimated sender-receiver percentages; and
for a given time period:
determining current actual costs for each sender to receivers; and
determining estimated cost allocations for each receiver in the organization based on a function of the current actual costs for each sender and using the sender-receiver percentages matrix by multiplying estimated respective sender-receiver percentages by corresponding actual costs for a given sender and receiver; and providing, for presentation to a user, a report that includes the estimated cost allocations.

10. The non-transitory computer-readable media of claim 9, the operations further comprising:

determining an accuracy of a given estimated cost allocation based at least in part on outlier information, including new and removed cost centers; and providing, with the report, the accuracy associated with the given estimated cost allocation.

11. The non-transitory computer-readable media of claim 9, wherein weights used for the weighted transactions are assigned based on cyclical periods that are similar to the given time period.

* * * * *